United States Patent [19]

Shoben

[11] 3,999,294
[45] Dec. 28, 1976

[54] FLEXIBLE BLADED SAW

[76] Inventor: George Shoben, 12309 Middle Road, Silver Spring, Md. 20906

[22] Filed: May 7, 1976

[21] Appl. No.: 684,076

[52] U.S. Cl. .............................. 30/166 R; 30/378; 145/31 R

[51] Int. Cl.² .................. B23D 57/02; B27B 19/04

[58] Field of Search ............ 30/166 R, 166 A, 383, 30/378; 145/31 R, 31 A, 31 AB, 31 AD

[56] References Cited

UNITED STATES PATENTS

| 605,368 | 6/1898 | Wrublik | 30/378 X |
|---|---|---|---|
| 1,616,880 | 2/1927 | Swanstrom | 30/166 R |
| 2,749,949 | 6/1956 | Trameryc | 30/166 |
| 3,181,239 | 5/1965 | Skok | 30/378 X |
| 3,192,973 | 7/1965 | O'Link | 145/31 R |

FOREIGN PATENTS OR APPLICATIONS

| 954,370 | 6/1947 | France | 30/166 R |
|---|---|---|---|
| 226,053 | 9/1910 | Germany | 30/378 |

*Primary Examiner*—Al Lawrence Smith
*Assistant Examiner*—J. C. Peters
*Attorney, Agent, or Firm*—Jay H. Maioli

[57] ABSTRACT

A pruning saw having an arcuately shaped housing which guides a flexible saw blade as the blade moves back and forth within the housing. The saw blade is comprised of toothed blade segments, pivotally fastened together. Each segment has its teeth bent or set to produce a kerf which is greater in width than the width of the housing.

10 Claims, 3 Drawing Figures

FLEXIBLE BLADED SAW

BACKGROUND OF THE INVENTION

Tree pruning is an ongoing task which is required for several reasons, such as maintaining power line clearances, aesthetic reasons or to eliminate diseased limbs. Because of the magnitude of this tree pruning task, there are currently available a multitude of devices to remove limbs or to cut down entire trees. Among these are traditional pruning saws, long-handled shears which lop off smaller branches, and electric and gasoline engine powered chain saws. Most of the pruning tools currently available require the user to be in proximity with the limb, which is often difficult and may require the use of ladders or even specialized equipment such as the hydraulically operated "cherry-picker." Moreover, chain saws are expensive, relatively heavy, and more importantly are potentially dangerous, especially to the occasional user such as the average home-owner. Furthermore, chain saws are noisey and unsuitable for use in quiet areas typified by hospital zones and neighborhoods near rest homes. However, as early as the end of the nineteenth century there have been produced hand-powered chain-type, flexible-bladed saws. These saws generally consist of a series of saw blade segments loosely riveted together with a rope or chain fastened at each end. One end of the rope is placed over or around the limb to be removed and then pulled tight so that the saw blades are brought into contact with the wood. Each end of the rope is alternately pulled and the saw blades are intended to cut through the limb. These previously known hand-powered saws looked good on paper, but in practice did not perform up to expectations. One problem was that each back-and-forth stroke had to be in the same plane or else the saw blade would bind in the wood. Also, it was difficult to exert sufficient pressure on the saw while drawing it back and forth, i.e., the teeth merely rode across the wood surface and did not cut into it sufficiently or dug in so deeply that it was impossible to move the blade at all.

SUMMARY OF THE INVENTION

The present invention provides an improved hand powered flexible pruning saw having a specialized housing which is held securely in position around the limb to be pruned. The flexible blade itself is comprised of a series of toothed saw blade portions, pivotally attached to each other and which have bearing surfaces to permit the blade to maintain alignment with each other, while riding smoothly within the housing. Each saw blade portion has two or more teeth which are bent or set in such a way as to make a wide cut in the limb when the saw is operated. The saw teeth are set by an amount which is sufficient to produce a cut which is at least as wide as the specialized housing which guides and holds the flexible blade. The housing itself is arcuately shaped to fit around or over the branch being pruned and is provided with tension springs affixed at each end. The other ends of the springs are attached to ropes or the like which are in turn secured to the ground by stakes or weights or even by the use of plates which may be stood upon by the user. In this way the housing is biased to proceed through the saw cut and the blade is always held in contact with the limb.

It is therefore an object of the present invention to provide a hand powered flexible saw which may be easily operated and which does not bind in the limb being cut.

It is a further object of the present invention to provide a flexible saw having a segmented blade wherein each segment contains saw teeth having a preselected set and which can be drawn back and forth.

It is still a further object to provide a segmented flexible bladed saw which has a housing portion to guide the blade and to follow the blade into the kerf.

It is finally a still further object to provide a flexible saw having a movable segmented blade and a guide which continuously is held in contact with a limb and which follows the blade into the kerf.

DETAILED DESCRIPTION OF THE PREFERRED EMBODIMENT

Figure 1:
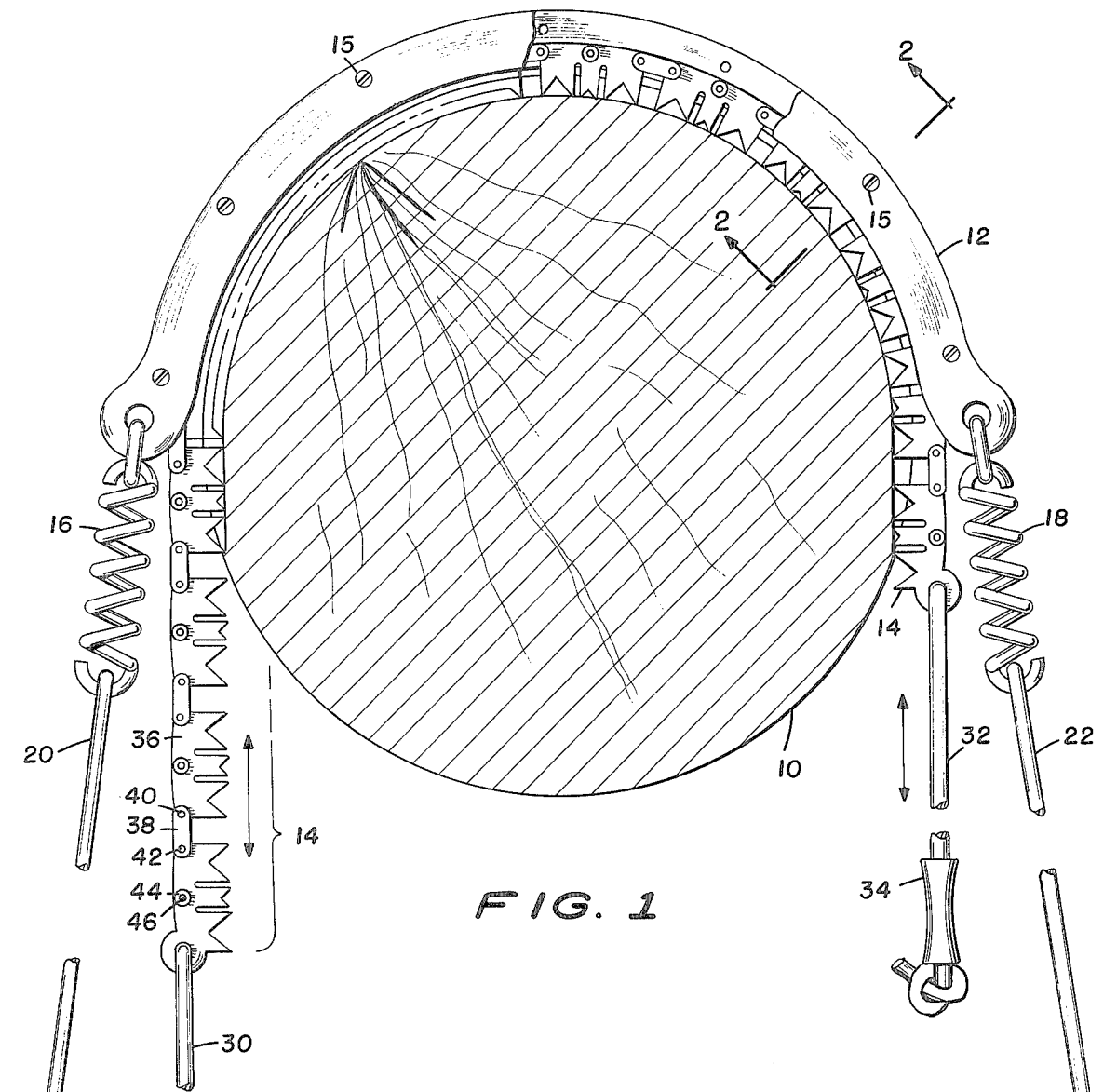
FIG. 1 is pictoral representation of the preferred embodiment of the present invention arranged in contact with a limb to be sawed.

Referring now to FIG. 1 the peferred embodiment of the present invention is shown in place over a wooden limb 10 which is being pruned. A specialized housing 12 is provided which is arcuately shaped to fit around the limb. The housing 12, which is constructed such that the segmented saw blade 14 can smoothly ride within it is formed of two segments held together by a suitable fastener such as the screw shown typically at 15. The housing construction will be discussed in greater detail hereinafter. Tension springs 16 and 18 are secured at either end of the housing and pieces of rope or cable 20 and 22 are attached to the other ends of the springs. The ropes 20, 22 are in turn secured to the ground 24 by stakes 24 and 26 so as to firmly hold the housing 12 around the limb 10 and to place the springs 16, 18 in tension.

The segmented saw blade 14 is also provided with ropes or cables 30 and 32 which are fastened to either end of the blade. These ropes 30, 32 must be at least as long as the housing cables 20, 22 and are provided with handles shown typically at 34, so that the operator may get a firm grip on the ropes. The saw blade 14 is made up of a series of identical segments, shown typically at 36, which are pivotally fastened together by means of a link 38 and two rivets shown typically at 40 and 42 respectively. Although, the saw blade segments 36 are said to be identical it is of course understood that the two segments at either end of the composite blade will be slightly different so as to provide some means to which to fasten the ropes 30, 32. Such differences may consist merely of an eye or hole through which the ropes are tied. Each portion of the segmented blade 14 is provided with a specialized cylindrical roller, shown typically at 44, held in place by a suitable fastener, such as a rivet 46. The roller 44 is allowed to spin on the rivet 46 and is designed in connection with the housing 12, so that when the saw is operated the segmented blade 14 moves easily but without excessive lateral motion, or play, within the housing 12.

Figure 2:
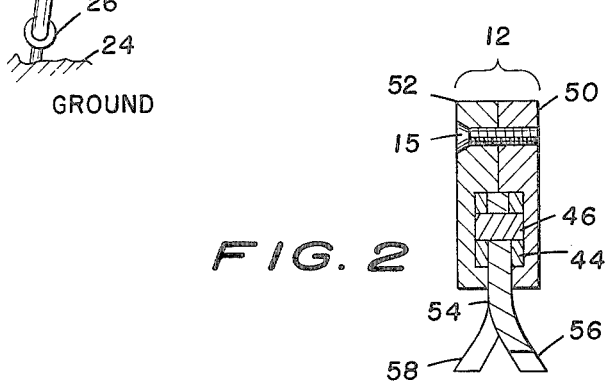
FIG. 2 is a cross-sectional view of a selected portion of the embodiment of FIG. 1.

In order to better show the manner in which the specialized housing 12 and the segmented saw blade cooperate, FIG. 2 is referred to. This figure shows a section of the assembled saw, taken at A—A as shown in FIG. 1. As mentioned the housing 12 is constructed of two portions 50 and 52 held together by suitable fasteners, such as the screw 15. The saw blade is captured by the assembled housing 12 and the rotatable bearing 44 is then located inside the cavity or race formed by the two portions 50, 52 of the housing 12. This bearing 44 is permitted to rotate in relation to the saw blade segment 54 by use of a rivet 46, and as the saw is operated serves to locate the blade within the housing while permitting the blade to have freedom of movement along the entire length of the housing. FIG. 2 also illustrates the improvement of the present invention which permits the saw to be operated without binding or seizing-up within the limb being pruned. More specifically, the total width of the housing 12 assembly containing the roller 44 and rivet 46 is less than the width of the kerf which will be produced by the blade segment 54, thereby permitting the housing to follow the blade into the cut without binding. This offers the advantage that the segmented blade is always held firmly by the housing. Of course, since FIG. 2 is a sectional view taken through the approximate middle of a saw blade segment 54 only two of the three teeth can be shown. However, it can be seen that tooth 56 lies outside of, or extends farther than the outside edge of housing segment 50. The center tooth 58 is not bent or set to the same extreme amount as the leading and trailing teeth but has a slight set which alternates direction on each successive blade segment. As described above each blade segment may contain multiple teeth and, in such case, the teeth lying between the two end teeth should be set in alternate directions on the same blade segment.

Figure 3:
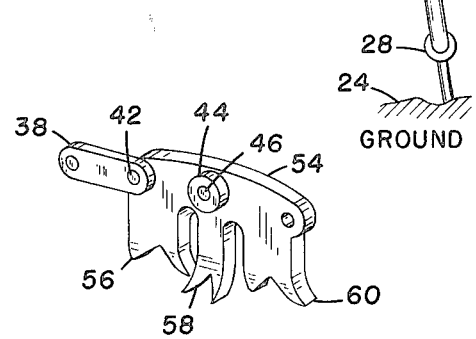
FIG. 3 is a single segment of the saw blade of FIG. 1.

Referring now to FIG. 3 a partially assembled segment of the flexible saw blade is shown. As described above, in the present embodiment each segment has three teeth, each have a well defined set. In the segment 54 which is shown, tooth 60, which was not shown in FIG. 2, is bent forward or up from the plane of the blade segment, as is center tooth 58, while the tooth 56 is bent backward or down from the plane of the blade segment. The set of the two teeth 56 and 60 must be sufficient to produce a kerf which is wider than the assembled width of the housing. In the case where a blade segment has more than three teeth, the middle teeth would be set in alternate directions, i. e., upwards and downwards from the plane of the blade segment. As a further aid to understanding the manner in which the flexible blade is assembled, the link 38 is shown fastened to segment 54 by a rivet 42 which permits movement between the link 38 and the blade segment 54. Also shown is the roller 44 or bearing which fits inside the housing. The roller 44 is fastened to the segment 54 by means of a rivet 46 in such a way as to permit each roller to spin on its rivet.

It is of course understood that the details of the above-described embodiment are not intended to limit the present invention but are shown as examples only. For example, blade segments may have more or less than three teeth, and may be pivotally fastened to each other without the need for connecting links. Similarly, the bearing need not be a roller but could be a captive ball or a solid block of a suitably impregnated bearing material such as bronze.

I claim:
1. An improved saw for use in manually pruning a tree limb comprising:
   an arcuately shaped housing having a substantially hollow interior and a circumferential slot therein facing toward the center of the arc thereby forming a channel,
   a plurality of saw toothed blade segments pivotally attached end to end in serial fashion so as to form a single flexible saw blade and being slidably positioned in said channel with the teeth extending through said slot,
   means for continuously maintaining said housing and said saw tooth blade segments in contact with said tree limb, and
   handle means attached to opposite ends of said single flexible saw blade for manually sliding said blade back and forth within said channel while being in contact with said tree limb.
2. The apparatus of claim 1 further comprising antifriction bearing means affixed to said flexible saw and being in contact with the substantially hollow interior of said housing.
3. The apparatus of claim 2 wherein said blade segments are formed having the saw teeth alternately set for producing a kerf of width greater than the thickness of said housing.
4. The apparatus of claim 3 wherein said means for maintaining contact comprises:
   first and second bias elements each having one end attached to opposite ends of said housing, and
   first and second flexible cable means each having one end attached to the free end of said first and second bias elements and each having the other end fixedly attached to the earth.
5. The apparatus of claim 4 wherein said handle means comprises a third and fourth flexible cable means each having a means for manually grasping one end.
6. A manually operated tree limb saw comprising:
   a plurality of substantially flat toothed saw blade segments pivotally fastened end to end forming an elongated flexible saw blade,
   housing means being arcuately formed and having a slot on the inner circumference thereby forming a channel and positioned so that said channel surrounds said elongated saw blade with the saw tooth extending through said slot whereby said elongated saw blade may slide within said channel,
   a plurality of antifriction bearing means attached to said blade segments and resting within said channel for permitting the elongated saw blade to slide easily with said channel,
   means attached to said housing for maintaining said elongated saw blade in continuous contact with said tree limb, and
   cable means attached to both ends of said elongated saw blade for manually drawing said saw blade back and forth in contact with said tree limb.
7. The tree limb saw of claim 6 wherein the teeth of said toothed saw blade segment are bent to produce a kerf of width greater than the thickness of said housing.
8. The tree limb saw of claim 7 wherein said antifriction bearing means each comprise a roller bearing rotatably attached to said saw blade segment.
9. The tree limb saw of claim 8 wherein said saw blade segments are pivotally fastened end to end by elongated links fastened to each blade segment by means of a rivet.
10. The tree limb saw of claim 9 wherein said means for maintaining contact between said elongated saw blade and said tree limb comprises:
   first and second spring means each having one end fastened to opposite ends of said elongated saw blade, and
   first and second flexible rope means each having one end attached respectively to the free end of said first and second spring means and each having the opposite end anchored to the ground.

* * * * *